(12) United States Patent
Xiao et al.

(10) Patent No.: US 10,326,136 B2
(45) Date of Patent: Jun. 18, 2019

(54) POROUS CARBONIZED COMPOSITE MATERIAL FOR HIGH-PERFORMING SILICON ANODES

(71) Applicant: GM Global Technology Operations LLC, Detroit, MI (US)

(72) Inventors: Xingcheng Xiao, Troy, MI (US); Weidong Zhou, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/868,878

(22) Filed: Sep. 29, 2015

(65) Prior Publication Data

US 2017/0092950 A1   Mar. 30, 2017

(51) Int. Cl.
*H01M 4/13* (2010.01)
*H01M 4/587* (2010.01)
(Continued)

(52) U.S. Cl.
CPC ........... *H01M 4/587* (2013.01); *H01M 4/362* (2013.01); *H01M 4/364* (2013.01); *H01M 4/366* (2013.01); *H01M 4/38* (2013.01); *H01M 4/386* (2013.01); *H01M 4/581* (2013.01); *H01M 4/5815* (2013.01); *H01M 10/052* (2013.01); *H01M 10/0525* (2013.01); *H01M 2004/021* (2013.01)

(58) Field of Classification Search
CPC ...... H01M 4/587; H01M 4/364; H01M 4/366; H01M 4/38; H01M 4/386; H01M 4/581; H01M 4/5815; H01M 10/052; H01M 10/0525; H01M 2004/021
See application file for complete search history.

(56) References Cited

U.S. PATENT DOCUMENTS 5,352,493 A * 10/1994 Dorfman ............... A61L 27/306
  347/62
7,736,805 B2   6/2010 Nazri et al.
(Continued)

FOREIGN PATENT DOCUMENTS

CN       1767234 A    5/2006
CN     101299397 A   11/2008
(Continued)

OTHER PUBLICATIONS

Yi Cui; "Designing Silicon Nanostructures for High Energy Lithium Ion Battery Anodes"; Stanford University, and SLAC National Accelerator Laboratory; May 14, 2012; 20 pages.
(Continued)

*Primary Examiner* — Raymond Alejandro
(74) *Attorney, Agent, or Firm* — Harness, Dickey & Pierce, P.L.C.

(57) ABSTRACT

An electrode material for an electrochemical cell, such as a lithium ion battery or a lithium sulfur battery, is provided. The electrode may be a negative anode. The electrode material comprises a composite comprising a porous matrix comprising a carbonized material. The electrode material further comprises a plurality of silicon particles homogeneously dispersed in the porous matrix of carbonized material. Each silicon particle of the plurality has an average particle diameter of greater than or equal to about 5 nanometers and less than or equal to about 20 micrometers.

10 Claims, 7 Drawing Sheets

16.7 μm

Figure 1:
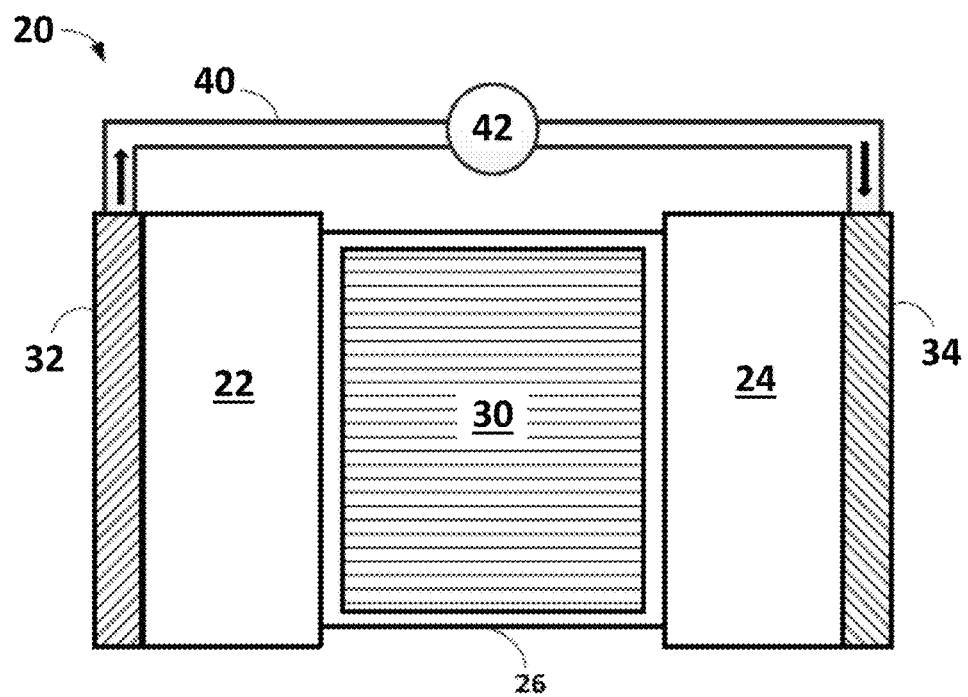

(51) Int. Cl.
*H01M 4/36* (2006.01)
*H01M 4/38* (2006.01)
*H01M 4/58* (2010.01)
H01M 10/052 (2010.01)
H01M 10/0525 (2010.01)
H01M 4/02 (2006.01)

(56) References Cited

U.S. PATENT DOCUMENTS

| | | | |
|---|---|---|---|
| 8,101,152 B1 | 1/2012 | Halalay et al. | |
| 8,399,138 B2 | 3/2013 | Timmons | |
| 8,420,259 B2 | 4/2013 | Xiao et al. | |
| 8,440,350 B1 | 5/2013 | Verbrugge et al. | |
| 8,642,201 B2 | 2/2014 | Cheng et al. | |
| 8,658,295 B2 | 2/2014 | Cheng et al. | |
| 8,679,680 B2 | 3/2014 | Vanimisetti et al. | |
| 8,835,056 B2 | 9/2014 | Xiao et al. | |
| 8,945,431 B2 | 2/2015 | Schulz et al. | |
| 9,012,075 B2 | 4/2015 | Verbrugge et al. | |
| 9,379,374 B2 | 6/2016 | Liu et al. | |
| 2007/0111102 A1* | 5/2007 | Inoue | H01M 4/362 429/232 |
| 2008/0261116 A1 | 10/2008 | Burton et al. | |
| 2009/0053608 A1* | 2/2009 | Choi | H01M 4/0428 429/231.95 |
| 2009/0325071 A1 | 12/2009 | Verbrugge et al. | |
| 2012/0100403 A1 | 4/2012 | Wang et al. | |
| 2012/0219852 A1 | 8/2012 | Huang et al. | |
| 2012/0229096 A1 | 9/2012 | Nazri | |
| 2012/0328927 A1 | 12/2012 | Timmons et al. | |
| 2013/0071736 A1 | 3/2013 | Xiao et al. | |
| 2013/0099159 A1 | 4/2013 | Halalay et al. | |
| 2013/0130115 A1 | 5/2013 | Park et al. | |
| 2013/0157125 A1 | 6/2013 | Sachdev et al. | |
| 2013/0177804 A1 | 7/2013 | Verbrugge et al. | |
| 2013/0189575 A1* | 7/2013 | Anguchamy | H01M 4/134 429/211 |
| 2013/0323595 A1 | 12/2013 | Sohn et al. | |
| 2014/0205905 A1 | 7/2014 | Xiao et al. | |
| 2014/0272578 A1 | 9/2014 | Xiao et al. | |
| 2014/0302396 A1* | 10/2014 | Lu | H01M 4/386 429/231.8 |
| 2018/0083268 A1 | 3/2018 | Huang | |

FOREIGN PATENT DOCUMENTS

| | | |
|---|---|---|
| CN | 102089240 A | 6/2011 |
| CN | 102509781 A | 6/2012 |
| CN | 103137953 A | 6/2013 |
| CN | 106558687 A | 4/2017 |
| DE | 102016117690 A1 | 3/2017 |
| WO | 2015176241 A1 | 11/2015 |

OTHER PUBLICATIONS

Gao Liu; "Advanced Binder for Electrode Materials"; Lawrence Berkeley National Laboratory, Berkeley, CA 94720; Jun. 8, 2010; 17 pages.

First Office Action for Chinese Patent Application No. 201610833792.X dated Aug. 14, 2018 and correspondence dated Aug. 16, 2018 from China Patent Agent (H.K.) Ltd. summarizing contents, 9 pages.

* cited by examiner

POROUS CARBONIZED COMPOSITE MATERIAL FOR HIGH-PERFORMING SILICON ANODES

FIELD

The present disclosure relates to electrode materials for electrochemical devices, and more particularly to high performance silicon-containing electrodes for lithium ion and lithium sulfur electrochemical devices, methods for making such silicon-containing electrodes, and methods of use thereof.

BACKGROUND

This section provides background information related to the present disclosure which is not necessarily prior art.

High-energy density, electrochemical cells, such as lithium ion batteries and lithium sulfur batteries can be used in a variety of consumer products and vehicles, such as Hybrid Electric Vehicles (HEVs) and Electric Vehicles (EVs). Typical lithium ion and lithium sulfur batteries comprise a first electrode (e.g., a cathode), a second electrode (e.g., an anode), an electrolyte material, and a separator. Often a stack of battery cells are electrically connected to increase overall output. Conventional lithium ion and lithium sulfur batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Typical electrochemically active materials for forming an anode include lithium-graphite intercalation compounds, lithium-silicon intercalation compounds, lithium-tin intercalation compounds, lithium alloys. While graphite compounds are most common, recently, anode materials with high specific capacity (in comparison with conventional graphite) are of growing interest. For example, silicon has the highest known theoretical charge capacity for lithium, making it one of the most promising materials for rechargeable lithium ion batteries. However, current anode materials comprising silicon suffer from significant drawbacks. The large volume changes (e.g., volume expansion/contraction) of silicon-containing materials during lithium insertion/extraction (e.g., intercalation and deintercalation) results in cracking of the anode, a decline of electrochemical cyclic performance and diminished Coulombic charge capacity (capacity fade), and limited cycle life.

It would be desirable to develop high performance negative electrode materials comprising silicon for use in high power lithium ion batteries, which overcome the current shortcomings that prevent their widespread commercial use, especially in vehicle applications. For long term and effective use, anode materials containing silicon should be capable of minimal capacity fade and maximized charge capacity for long-term use in lithium ion batteries.

SUMMARY

This section provides a general summary of the disclosure, and is not a comprehensive disclosure of its full scope or all of its features.

In certain variations, the present disclosure provides an electrode material for an electrochemical cell, such as a lithium ion battery or a lithium sulfur battery. The electrode may be a negative electrode. The electrode material comprises an electrochemically active composite comprising a porous matrix comprising a carbonized material. The electrode material further comprises a plurality of particles homogeneously dispersed in the porous matrix of carbonized material. The particles may comprise silicon, including silicon oxide. In alternative aspects, the particles may comprise other negative electrode materials which have lower sensitivity to acids. Each particle of the plurality optionally has an average particle diameter of greater than or equal to about 5 nanometers and less than or equal to about 20 micrometers.

In certain other aspects, the present disclosure provides an electrochemical cell comprising a negative electrode, a positive electrode, a separator, and an electrolyte. The negative electrode comprises an electrochemically active composite comprising a porous matrix comprising a carbonized material, and a plurality of particles. The particles may comprise silicon, including silicon oxide. In alternative aspects, the particles may comprise other negative electrode materials which have lower sensitivity to acids. Each particle of the plurality optionally has an average particle diameter of greater than or equal to about 5 nanometers and less than or equal to about 20 micrometers.

In yet other aspects, the present disclosure provides a method of making a negative electrode material for an electrochemical cell, which may be a lithium ion battery or a lithium sulfur battery. The method comprises reacting an acid having a pH of less than or equal to about 3 with an admixture of a silicon-containing precursor and a sugar to form a solid porous precursor composite material. The method further comprises heating the solid porous precursor composite material to a temperature of greater than or equal to about 300° C. to less than or equal to about 900° C. for a duration of greater than or equal to 30 minutes to form a porous composite electrode material comprising a matrix comprising a carbonized material having a plurality of homogeneously dispersed silicon particle distribute therein. In certain aspects, the heating may be done in a reducing atmosphere, an inert atmosphere, or under negative pressure conditions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
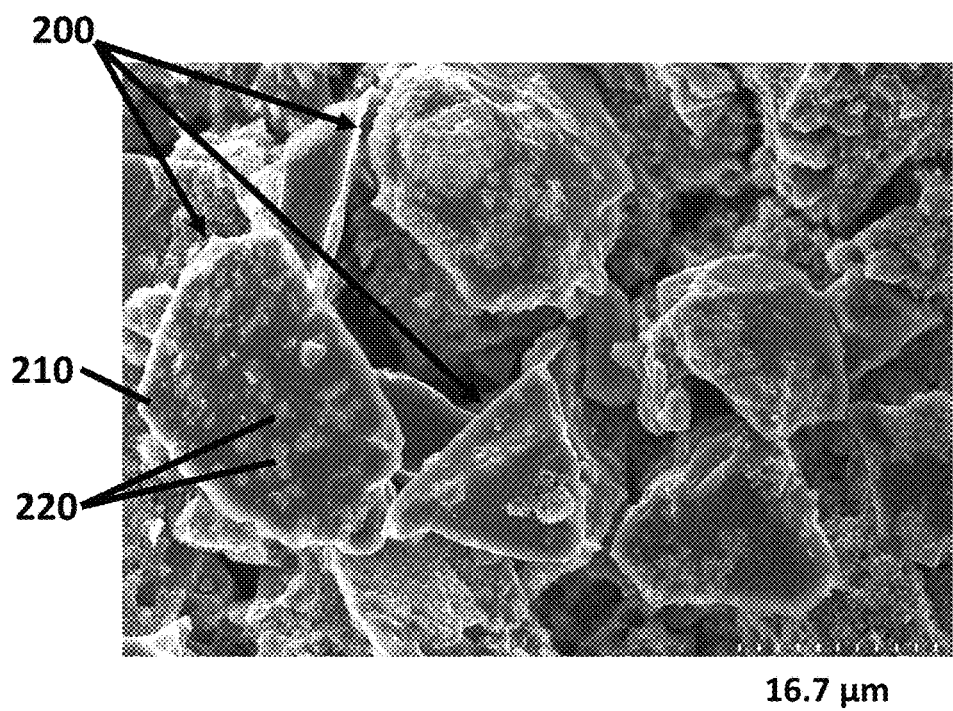
Figure 2B:
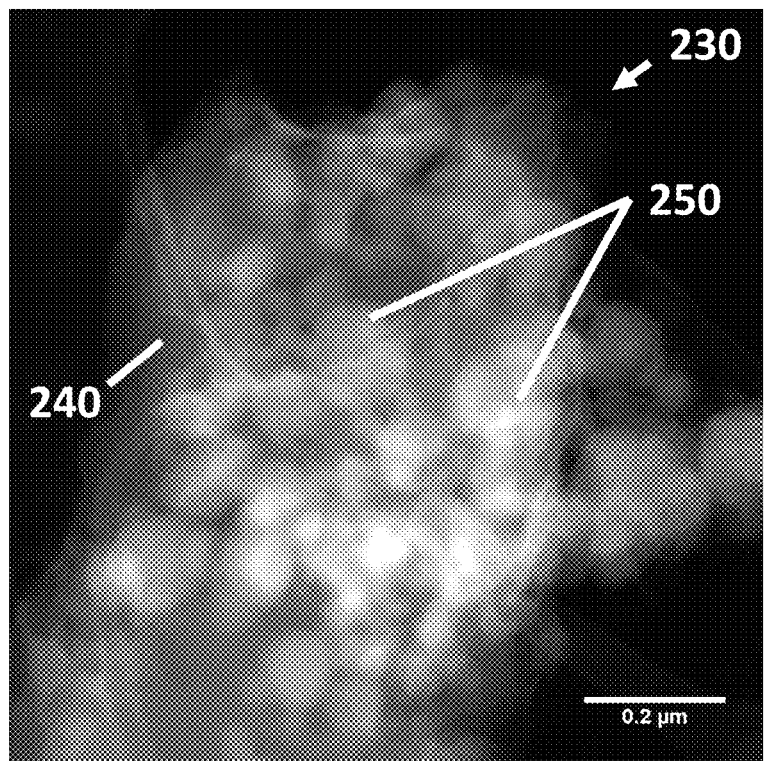
Figure 2C:
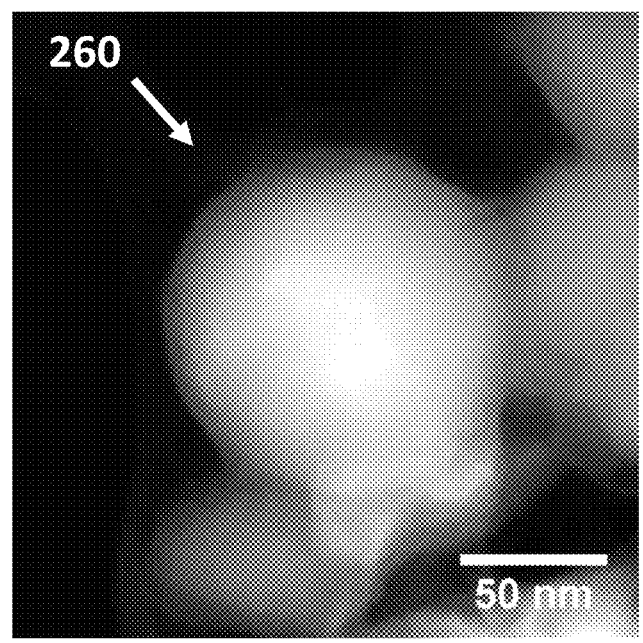
Figure 2D:
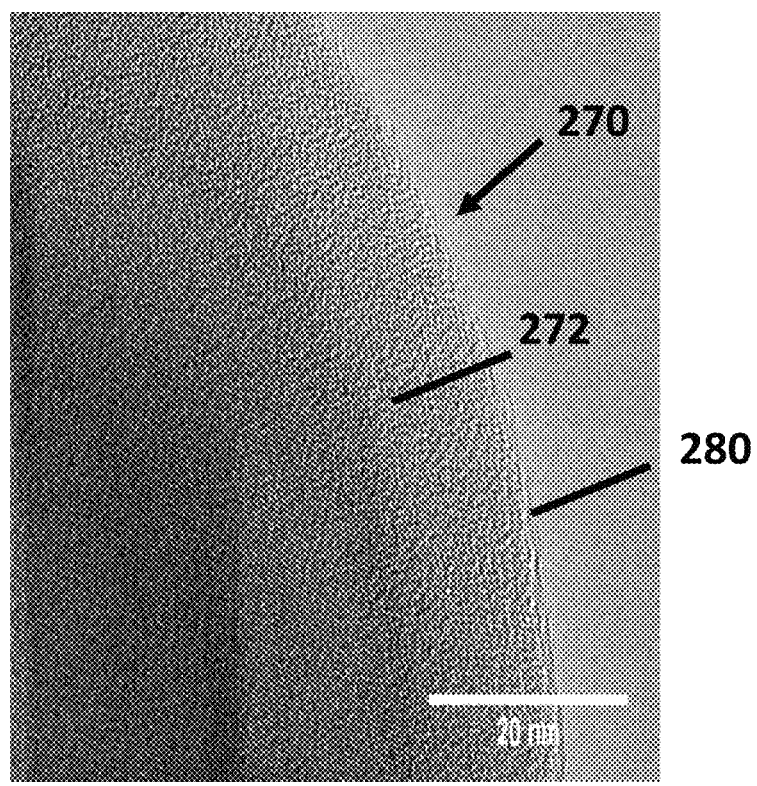
Figure 3:
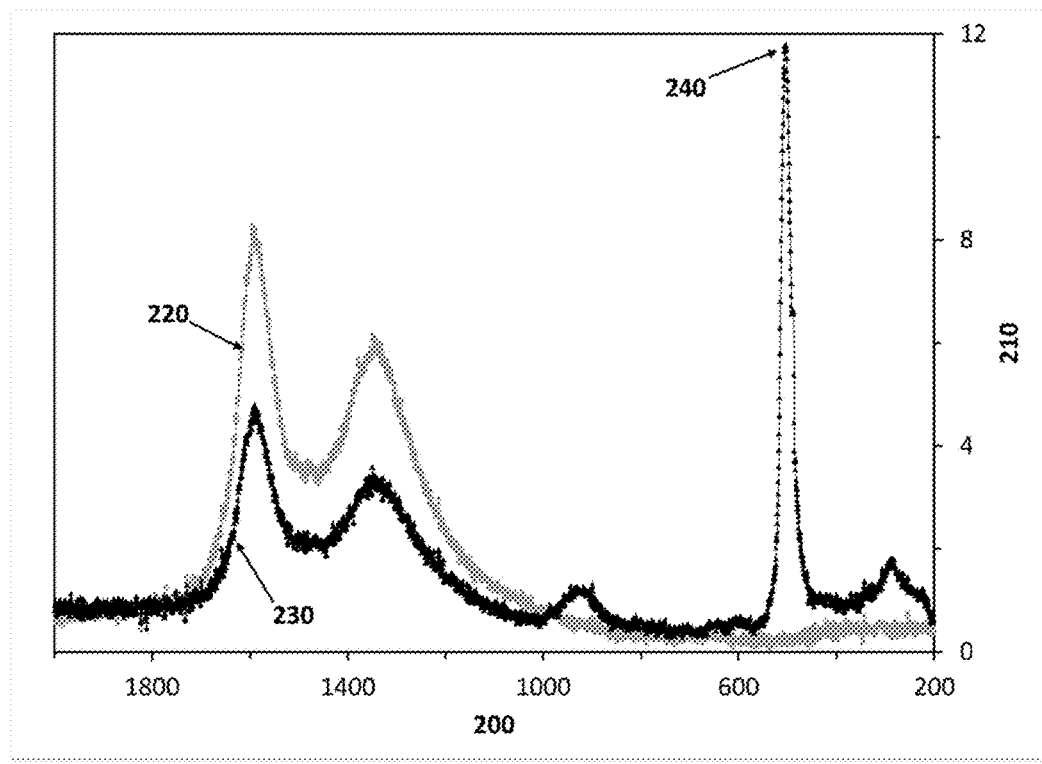
Figure 4:
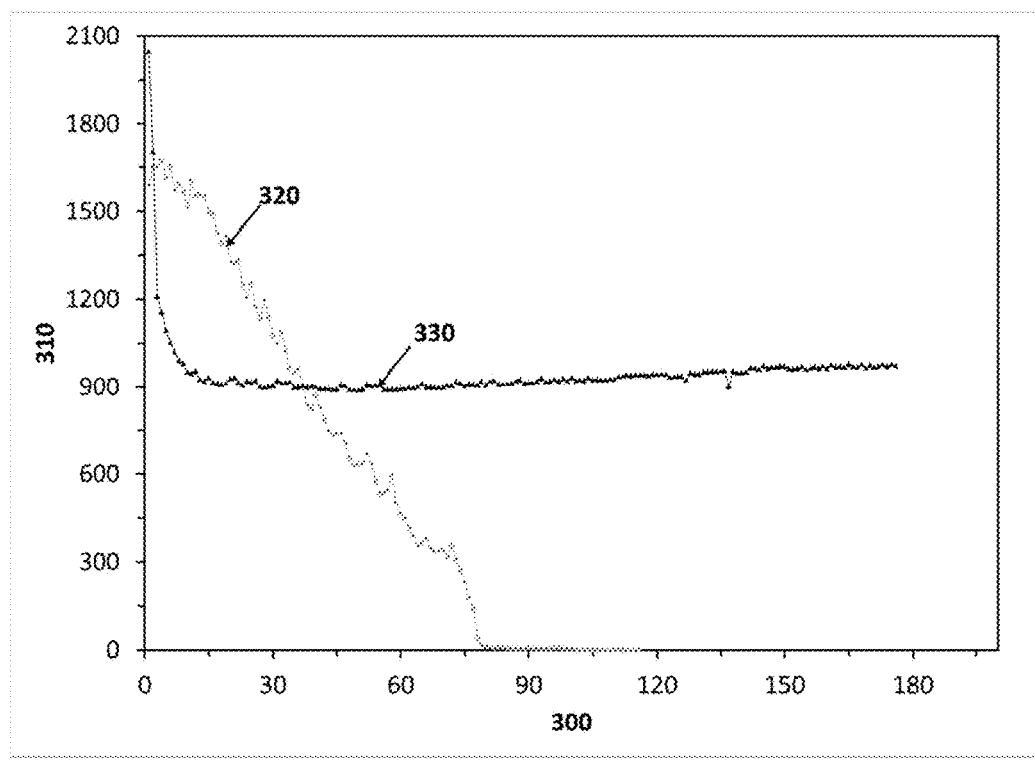

FIG. 1 is a schematic of an exemplary electrochemical battery cell;

FIGS. 2A-2D are scanning/transmission electron microscopy images. FIGS. 2A (scanning electron microscopy image) and 2B (transmission electron microscopy image) show hierarchy composite particles according to certain aspects of the present disclosure, while FIGS. 2C and 2D are transmission electron microscopy images of silicon nanoparticles covered by a layer of amorphous carbon according to certain aspects of the present disclosure;

FIG. 3 shows Raman spectra of two materials: a composite electrode material according to the present disclosure; and porous carbonized material without silicon particles made by a similar process; and FIG. 4 shows specific capacity of a lithium ion battery having a Si/C anode according to the present disclosure over 180 cycles of charging and discharging.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

As used herein, the terms "composition" and "material" are used interchangeably to refer broadly to a substance containing at least the preferred chemical compound, but which may also comprise additional substances or compounds, including impurities.

The present technology pertains to improved electrochemical cells, including batteries, especially lithium ion batteries and lithium sulfur batteries that may be used in vehicle applications. An exemplary and schematic illustration of a battery 20 is shown in FIG. 1. The battery may be a lithium ion electrochemical cell or a lithium sulfur electrochemical cell. The battery 20 includes a negative electrode 22, a positive electrode 24, and a separator 30 (e.g., a microporous polymeric separator) disposed between the two electrodes 22, 24. The separator 26 comprises an electrolyte 30, which may also be present in the negative electrode 22 and positive electrode 24. A negative electrode current collector 32 may be positioned at or near the negative electrode 22 and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise the electrolyte 30 capable of conducting lithium ions. The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, can provide a minimal resistance path for internal passage of lithium ions (and related anions) for facilitating functioning of the battery 20.

The battery 20 can generate an electric current during discharge by way of reversible electrochemical reactions that occur when the external circuit 40 is closed (to connect the negative electrode 22 and the positive electrode 34) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated lithium at the positive electrode 24. The electric current passing through the external circuit 18 can be harnessed and directed through the load device 42 until the intercalated lithium in the negative electrode 22 is depleted and the capacity of the battery 20 is diminished.

The battery 20 can be charged or re-powered at any time by connecting an external power source to the lithium ion battery 20 to reverse the electrochemical reactions that occur during battery discharge. The connection of an external power source to the battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with intercalated lithium for consumption during the next battery discharge cycle. The external power source that may be used to charge the battery 20 may vary depending on the size, construction, and particular end-use of the battery 20. Some notable and exemplary external power sources include, but are not limited to, an AC wall outlet and a motor vehicle alternator. In many lithium ion battery and lithium sulfur battery configurations, each of the negative current collector 32, negative electrode 22, the separator 26, positive electrode 24, and positive current collector 34 are prepared as relatively thin layers (for example, several micrometers or a millimeter or less in thickness) and assembled in layers connected in electrical parallel arrangement to provide a suitable energy package.

Furthermore, the battery 20 can include a variety of other components that while not depicted here are nonetheless known to those of skill in the art. For instance, the lithium ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium ion cells or batteries to produce a greater voltage output and power density if it is required by the load device 42.

Accordingly, the battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the battery 20 for purposes of storing energy.

Any appropriate electrolyte 30, whether in solid form or solution, capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20. A non-limiting list of lithium salts that may be dissolved in an organic solvent to form the non-aqueous liquid electrolyte solution include $LiPF_6$, $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)_2$, and combinations thereof. These and other similar lithium salts may be dissolved in a variety of organic solvents, including but not limited to various alkyl carbonates, such as cyclic carbonates (ethylene carbonate (EC), propylene carbonate (PC), butylene carbonate (BC)), acyclic carbonates (dimethyl carbonate (DMC), diethyl carbonate (DEC), ethylmethylcarbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The separator 30 may comprise, in one embodiment, a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP.

When the separator 30 is a microporous polymeric separator, it may be a single layer or a multi-layer laminate, which may be fabricated from either a dry or wet process. For example, in one embodiment, a single layer of the polyolefin may form the entire microporous polymer separator 30. In other aspects, the separator 30 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 30. The microporous polymer separator 30 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 30 as a fibrous layer to help provide the microporous polymer separator 30 with appropriate structural and porosity characteristics. Various conventionally available polymers and commercial products for forming the separator 30 are contemplated, as well as the many manufacturing methods that may be employed to produce such a microporous polymer separator 30.

In a lithium ion battery, the positive electrode 24 may be formed from a lithium-based active material that can sufficiently undergo lithium intercalation and deintercalation while functioning as the positive terminal of the lithium ion battery 20. The positive electrode 24 may include a polymeric binder material to structurally fortify the lithium-based active material. One exemplary common class of known materials that can be used to form the positive electrode 24 is layered lithium transitional metal oxides. For example, in certain embodiments, the positive electrode 24 may comprise at least one spinel comprising a transition metal like lithium manganese oxide ($Li_{(1+x)}Mn_{(2-x)}O_4$), where $0 \leq x \leq 1$, where x is typically less than 0.15, including $LiMn_2O_4$, lithium manganese nickel oxide ($LiMn_{(2-x)}Ni_xO_4$), where $0 \leq x \leq 1$ (e.g., $LiMn_{1.5}Ni_{0.5}O_4$), lithium cobalt oxide ($LiCoO_2$), lithium manganese oxide ($LiMn_2O_4$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $y<1$, and M may be Al, Mn, or the like, other known lithium-transition metal oxides or mixed oxides lithium iron phosphates, or a lithium iron polyanion oxide such as lithium iron phosphate ($LiFePO_4$) or lithium iron fluorophosphate ($Li_2FePO_4F$). Such active materials may be intermingled with at least one polymeric binder, for example, by slurry casting active materials with such binders, like polyvinylidene fluoride (PVDF), ethylene propylene diene monomer (EPDM) rubber, or carboxymethoxyl cellulose (CMC). The positive current collector 34 may be formed from aluminum or any other appropriate electrically conductive material known to those of skill in the art.

In a lithium sulfur battery, the positive electrode includes sulfur-based compounds for a positive active material. A sulfur-based compound may be selected from at least one of: elemental sulfur, $Li_2S_n$ (wherein n greater than or equal to 1), $Li_2S_n$ (wherein n greater than or equal to 1) dissolved in a catholyte, an organosulfur compound, and a carbon-sulfur polymer (($C_2S_x)_n$: wherein x=2.5, and n is 2 or greater). The positive electrode may also include electrically conductive materials that facilitate the movement of the electrons within the positive electrode. For example, graphite, carbon-based materials, or a conductive polymer. Carbon-based materials may include by way of non-limiting example ketchen black, denka black, acetylene black, carbon, black, and the like. Examples of a conductive polymer include polyaniline, polythiophene, polyacetylene, polypyrrole, and the like. The conductive material may be used singularly or as a mixture of two or more materials. The positive electrode may also include a polymeric binder as described above.

In certain aspects, the electrode may be a negative electrode (e.g., an anode). The electrode material comprises an electrochemically active composite. The electrode material comprises a composite comprising a porous matrix comprising a carbonized material, which may be carbon, and a plurality of particles homogenously dispersed in the porous matrix of carbonized material. The particles may comprise silicon, silicon oxide, and other negative electrode materials which are less sensitive to acid. By way of example, particles comprising silicon may include silicon, or silicon containing binary and ternary alloys and/or tin-containing alloys, such as Si—Sn, SiSnFe, SiSnAl, SiFeCo, and the like. In certain variations, each particle of the plurality has an average particle diameter of greater than or equal to about 5 nanometers and less than or equal to about 20 micrometers. In certain variations, the average particle diameter may be greater than or equal to about 5 nanometers to less than or equal to about 200 nanometers, optionally greater than or equal to about 50 nanometers to less than or equal to about 150 nanometers, and in certain variations, about 100 nanometers. The plurality of silicon-containing particles is capable of accepting the insertion of lithium ions during charging of the electrochemical cell ("intercalation") and releasing lithium ions during discharging of the electrochemical cell ("deintercalation"). Further, the carbonized material in the porous matrix is electrically conductive. Thus, the porous matrix is an electrochemically active porous matrix. In certain variations, the porous matrix of carbonized material may comprise a plurality of hierarchy composite particles, each hierarchy composite particle comprising a plurality of silicon nanoparticles. Each hierarchy composite particle of the plurality has an average diameter of greater than or equal to about 0.5 micrometers and less than or equal to about 50 micrometers.

As discussed above, silicon-containing particles undergo a significant volume expansion during intercalation. For example, the volume of a silicon particle after lithium insertion may be four (4) times larger than the volume of silicon before lithium insertion or after lithium extraction. The pores in the matrix of carbonized material are capable of accepting the large volume expansion of the silicon-containing particle during charging. In certain aspects, the porous material of this disclosure is advantageous because it because it reduces the occurrence of loss of electrical contact between particles during cycling, thereby increasing electrode integrity.

In certain aspects, a loading density of the plurality of silicon particles in the porous matrix of carbonized material is greater than or equal to about 0.1 mg/cm$^2$ and less than or equal to about 20 mg/cm$^2$. A packing density of the plurality of particles comprising silicon in the electrochemically active composite may be greater than or equal to about 5% and less than or equal to about 90%. In another embodiment, the packing density of the plurality of particles in the composite is greater than or equal to about 5% and less than or equal to about 80%. In other variations, the packing density of the plurality of particles in the composite is greater than or equal to about 5% and less than or equal to about 75%. High packing densities are enabled by the wide range in average diameter of the hierarchy composite particles. Higher packing densities are advantageous because they yield higher energy densities. However, lower packing densities are desirable to account for and permit greater silicon expansion. Thus, it may be beneficial to increase the porosity of the electrode at higher packing densities.

The negative electrode material of the present disclosure may be used in a conventional electrode forming process. The porosity of the electrode may be increased at higher packing densities. The negative electrode may comprise the negative electrode material of the present disclosure and a polymeric binder, which may be an ionomer. The conductivity of the electrode material of the present disclosure may eliminate the need for carbon black in the binder. Thus, in some aspects, the present disclosure contemplates a negative electrode that is substantially free of carbon black particles. By "substantially free" it is meant that carbon black particles are not intentionally added to the negative electrode.

FIG. 2A is a scanning electron microscopy image of a plurality of hierarchy composite particles 200. Each hierarchy composite particle of the plurality 200 comprises a carbonized matrix 210 and a plurality of silicon nanoparticles 220. Thus, the electrochemically active composite may be considered a network of clusters or hierarchy composite particles 200. Each hierarchy composite particle of the plurality 200 has an average diameter of greater than or equal to about 0.5 micrometers and less than or equal to about 50 micrometers, in certain variations.

FIG. 2B is a transmission electron microscopy image of a single hierarchy composite particle 230. The hierarchy composite particle 230 comprises a carbonized matrix 240 and a plurality of silicon nanoparticles 250.

FIG. 2C is a transmission electron microscopy image of silicon nanoparticle 260. FIG. 2D is a high resolution transmission electron microscopy image of a silicon nanoparticle 270. The silicon nanoparticle 270 has a surface 272 that is coated in a layer of carbonized material 280. It should be noted that at least a portion of the silicon nanoparticle is coated in a layer of carbonized material. For example, in certain variations, greater than or equal to about 30% of the surface area of a silicon nanoparticle is coated with a carbonized material, optionally greater than or equal to about 40%, optionally greater than or equal to about 50%, optionally greater than or equal to about 60%, optionally greater than or equal to about 70%, optionally greater than or equal to about 80%, optionally greater than or equal to about 90%, optionally greater than or equal to about 95%, optionally greater than or equal to about 97%, optionally greater than or equal to about 98%, optionally greater than or equal to about 99%, and in certain variations, 100% of the silicon nanoparticle is coated with a carbonized material.

A method of making a negative electrode material for use in a lithium ion battery or a lithium sulfur battery is also provided. In one embodiment, the method comprises reacting an admixture of a silicon-containing precursor and a sugar with an acid having a pH of at least about 3 to form a composite precursor material. The method may include heating the composite precursor material to a temperature of greater than or equal to about 300° C. to less than or equal to about 900° C., optionally from a temperature of greater than or equal to about 500° C. to less than or equal to about 900° C. The heating may be conducted for a duration of greater than or equal to thirty (30) minutes. While the heating and method may be performed under atmospheric conditions (e.g., in air), in certain aspects, the method is performed in an inert environment (under inert atmosphere), a reducing environment (under a reducing environment), or in a vacuum (negative pressure atmosphere) to minimize or prevent oxidation of the silicon.

The silicon and sugar admixture may be substantially homogeneous. A weight ratio of the silicon precursor to sugar may be between about 1:4 to about 9:1 in the starting admixture. In certain variations, a 1:1 weight ratio of the silicon-containing precursor to the sugar is used. The silicon-containing precursor may be a powder. For example, the silicon-containing precursor may be a nanopowder with an average particle size of about 100 nanometers.

Any sugar comprising C, H, and O may be used. In certain aspects, the sugar may be selected from the group consisting of: sucrose, maltose, lactose, fructose, glucose, galactose, and combinations thereof. In one variation, a low-cost and widely available sugar, such as sucrose ($C_{12}H_{22}O_{11}$), may be used.

In certain embodiments, the acid has a pH of less than or equal to about 3, optionally less than or equal to about 2, optionally less than or equal to about 1.5, and in certain aspects, optionally less than or equal to about 1. The acid may be sulfuric acid ($H_2SO_4$) having a high concentration, for example, greater than or equal to about 90% by weight in water. A weight ratio of acid to the silicon and sugar admixture may be between about 10:1 to about 1:1. The acid may be introduced to an admixture of silicon and sugar admixture. For example, the acid may be poured directly into the silicon and sugar admixture. No stirring is needed and the reaction is exothermic. A dehydration process thus occurs via this reaction. The resulting substance is an expanded porous precursor carbon composite with silicon particles homogeneously distributed throughout. For example, where concentrated $H_2SO_4$ is poured into a mixture of silicon particles and sugar, a de-hydration process creates an expanded composite material via the following reaction: $C_{12}H_{22}O_{11}(s) + H_2SO_4(aq) + \frac{1}{2}O_2(g) \rightarrow 11C(s) + CO_2(g) + 12H_2O(g) + SO_2(g)$.

The expanded porous precursor carbon composite is then heated to form a carbonized carbon composite in accordance with the various aspects of the present disclosure. In one embodiment, the method involves heating the porous precursor carbon composite to at least 300° C. In other aspects, the method involves heating the porous precursor carbon composite to at least 500° C. The temperature may be held for greater than or equal to about 30 minutes. For example, in one embodiment the high temperature of at least 500° C. is held for 2 hours. In other embodiments, the temperature may be up to 900° C. This process serves to further reduce and carbonize the materials in the matrix.

The electrode material is a porous electrochemically active carbon composite with silicon-containing particles homogeneously distributed throughout. More specifically, the each particle comprising silicon may be coated with a thin layer of carbonized material. The carbon-coated particles comprising silicon are then distributed throughout a carbonized matrix. The free space between particles accommodates expansion of the silicon-containing particles when they accept lithium ions during the charging process. In contrast to conventional silicon-containing electrode materials, the free space in the electrode material of the present invention results in less cracking of the electrode, an increase of electrochemical cyclic performance and increased Coulombic charge capacity, and increased cycle life. Furthermore, the process provides coating of the silicon-containing particles with carbon material and bonding of the silicon-containing particles with the carbon matrix to enhance electrical conductivity. As discussed elsewhere, the carbonized matrix potentially eliminates the need to add any conductive carbon black particles into an electrode due to the highly conductive composite material.

Example

In one experiment, 10 grams of 100 nm diameter silicon nanopowder precursor is admixed with 30 grams of sucrose ($C_{12}H_{22}O_{11}$). The silicon and sugar admixture is added to glass beaker under atmospheric conditions. 20 mL of 90 wt. % sulfuric acid ($H_2SO_4$) in water is poured over the silicon and sugar admixture without stirring. The exothermic reaction between the sugar and the sulfuric acid produces a porous composite comprising a porous carbon matrix and a plurality of homogeneously dispersed silicon particles. The porous carbon matrix is then heated to 500° C. and held at 500° C. for 2 hours to carbonize the porous matrix.

An electrode comprising the material of the foregoing process and a sodium alginate binder is formed using a conventional electrode fabrication process.

In FIG. 3, the y-axis shows Raman intensity (210), while wavenumber (200) is shown on the x-axis in $cm^{-1}$. A porous carbonized carbon material without embedded silicon particles is shown as 220. A porous composite comprising a carbonized matrix with embedded silicon according to the present disclosure is shown as 230. As indicated by the peak around 500 $cm^{-1}$ (240), at least a portion of the silicon particles is bonded to the carbonized material. These carbon-silicon bonds increase the electrical conductivity of the electrode material.

In FIG. 4, y-axis specific capacity (310) is in mAh/g units, while cycle number is shown on the x-axis (300). A conventional electrode comprising silicon nanopowder is shown as 320. The porous composite electrode of this example is shown as 330. The results generally indicate improved cycling performance of the porous composite electrode material of the present disclosure when compared to a conventional electrode comprising silicon nanopowder.

In certain variations, the present disclosure provides an electrode material for an electrochemical cell, such as a lithium ion battery or a lithium sulfur battery. The electrode may be a negative anode. The electrode material comprises an electrochemically active composite comprising a porous matrix comprising a carbonized material. The electrode material further comprises a plurality of particles homogeneously dispersed in the porous matrix of carbonized material. The particles may comprise silicon. Each particle of the plurality optionally has an average particle diameter of greater than or equal to about 5 nanometers and less than or equal to about 20 micrometers, or any of the average particle diameters discussed above. The plurality of particles is capable of accepting the insertion of lithium ions during charging of the electrochemical cell or battery and releasing lithium ions during discharging of the electrochemical cell or battery. In certain aspects, a portion of a surface of each particle of the plurality is coated in a layer of the carbonized material. As noted above, in certain aspects, this portion of the surface may cover substantially all of the exposed surface of the particle, for example, up to 100% of the surface area. The carbonized material optionally comprises a plurality of hierarchy composite particles, where each hierarchy composite particle of the plurality has an average particle diameter of greater than or equal to about 0.5 micrometers and less than or equal to about 50 micrometers.

The loading density of the plurality of silicon particles in the porous matrix of carbonized material is greater than or equal to about 0.1 $mg/cm^2$ and less than or equal to about 20 $mg/cm^2$. The packing density of the plurality of silicon particles in the composite is greater than or equal to about 5% and less than or equal to about 90% by volume. In other variations, the packing density of the plurality of silicon particles in the composite is greater than or equal to about 5% and less than or equal to about 75% by volume. At least a portion of the plurality of silicon particles is chemically bonded to the carbonized material.

In other aspects, the present disclosure contemplates an electrochemical cell, which may be a lithium ion battery or a lithium sulfur battery. The electrochemical cell may comprise a negative electrode, a positive electrode, a separator, and an electrolyte. The negative electrode may be any of the materials described in the preceding paragraphs. For example, the negative electrode comprises an electrochemically active composite that comprises a porous matrix of a carbonized material. The electrochemically active composite further comprises a plurality of silicon-containing particles homogeneously dispersed in the porous matrix. Each particle of the plurality optionally has an average particle diameter of greater than or equal to about 5 nanometers and less than or equal to about 20 micrometers. The negative electrode may be substantially free of carbon black particles. In certain variations, the positive electrode of the electrochemical cell may comprise an electrochemically active sulfur-containing material.

In other variations, the present disclosure provides a method of making a negative electrode material for an electrochemical cell, which may be a lithium ion battery or a lithium sulfur battery. The method comprises reacting an acid having a pH of less than or equal to about 3 with an admixture of a precursor comprising silicon and a sugar to form a solid porous precursor composite material. The method further comprises heating the solid porous precursor composite material to a temperature of greater than or equal to about 500° C. to less than or equal to about 900° C. for a duration of greater than or equal to 30 minutes to form a porous composite electrode material comprising a matrix comprising a carbonized material having a plurality of homogeneously dispersed silicon particles distributed therein.

In certain aspects, the silicon precursor is a powder with a particle size (e.g., average particle diameter) of about 100 nanometers. The sugar may be selected from the group consisting of: sucrose, maltose, lactose, fructose, glucose, galactose, and combinations thereof. In certain aspects, the sugar may be sucrose ($C_{12}H_{22}O_{11}$). The acid may comprise sulfuric acid ($H_2SO_4$), optionally at a concentration of greater than or equal to about 90%. In other aspects, the admixture of the silicon precursor and the sugar has a weight ratio in a range of 1:4 to 1:9, and optionally 1:1. In still other aspects, the weight ratio of the admixture of the silicon precursor and the sugar to the acid is in a range of 10:1 to 1:1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrode material for an electrochemical cell comprising:
a plurality of hierarchy composite particles having an average particle diameter of greater than or equal to about 0.5 micrometers and less than or equal to about 50 micrometers, each hierarchy composite particle of the plurality of hierarchy composite particles comprising:
a porous matrix comprising a carbonized material; and
a plurality of particles homogeneously distributed in pores of the porous matrix, each particle of the plurality of particles comprising silicon, having at least 70% of a surface area being coated with a layer of the carbonized material, and having an average particle diameter of greater than or equal to about 5 nanometers and less than or equal to about 20 micrometers, wherein at least a portion of the plurality of particles are chemically bonded to the carbonized material, and the pores of the porous matrix are configured to accept a volume expansion of the plurality of particles during cycling of the electrochemical cell.

2. The electrode material of claim 1, wherein the plurality of particles is capable of accepting an insertion of lithium ions during charging of the electrochemical cell and releasing lithium ions during discharging of the electrochemical cell.

3. The electrode material of claim 1, wherein at least 80% of a surface area of each particle of the plurality of particles is coated with a layer of the carbonized material.

4. The electrode material of claim 3, wherein at least 95% of a surface area of each particle of the plurality of particles is coated with a layer of the carbonized material.

5. The electrode material of claim 1, wherein a loading density of the plurality of particles comprising silicon in the porous matrix is greater than or equal to about 0.1 mg/cm$^2$ and less than or equal to about 20 mg/cm$^2$.

6. The electrode material of claim 1, wherein a packing density of the plurality of particles in the hierarchy composite particles is greater than or equal to about 5% and less than or equal to about 90% by volume.

7. The electrode material of claim 6, wherein the packing density of the plurality of particles in the hierarchy composite particles is greater than or equal to about 5% and less than or equal to about 75% by volume.

8. An electrochemical cell comprising:
a negative electrode comprising the electrode material of claim 1;
a positive electrode;
a separator; and
an electrolyte.

9. The electrochemical cell of claim 8, wherein the negative electrode is substantially free of carbon black particles.

10. The electrochemical cell of claim 8, wherein the positive electrode comprises an electrochemically active sulfur-containing material.

* * * * *